United States Patent [19]

Ackerman et al.

[11] 4,355,595
[45] Oct. 26, 1982

[54] CENTRAL MILKING SYSTEM WITH REDUCED STRAY CURRENT PROBLEMS

[75] Inventors: Roger A. Ackerman, 3517 N. Henderson Rd., Freeport, Ill. 61032; Kurt A. Ackerman, Freeport, Ill.

[73] Assignee: Roger A. Ackerman, Freeport, Ill.

[21] Appl. No.: 244,103

[22] Filed: Mar. 16, 1981

[51] Int. Cl.³ .............................................. A01K 1/12
[52] U.S. Cl. .................................................. 119/14.03
[58] Field of Search ............... 119/14.01, 14.03, 14.05, 119/14.06, 14.08, 14.43; 310/89, 91; 307/327; 417/423 R

[56] References Cited

U.S. PATENT DOCUMENTS

| | | | |
|---|---|---|---|
| 3,469,596 | 9/1969 | Branton | 119/14.43 X |
| 3,810,442 | 5/1974 | Jacobs et al. | 119/14.03 |
| 4,000,718 | 1/1977 | Brown | 119/14.03 |
| 4,188,910 | 2/1980 | Hocker | 119/14.08 |

OTHER PUBLICATIONS

Wm. Fairbank et al., *Milking Parlor Metal Structure-to-Earth Voltages*, 1978, pp. 1 to 11.
L. H. Soderholm, *Stray-Voltage Problems In Dairy Milking Parlors*, Dec., 1979, pp. 1 to 11.
Wm. Fairbank et al., *Detecting Stray Currents in Milking Parlors*, 1978, pp. 11 to 14.
R. D. Appleman et al., *Neutral-to-Ground Voltage Problems With Dairy Cows*, 1978, pp. 1 and 2.
Klenzade Products, *Stray Voltage In Dairy Barns: A Shocking Problem*, date unknown, pp. 1 and 2.
Mid-West Dairymen's Co., *The Mid-West Dairyman*, Jun. 15, 1980, pp. 1 and 2.
Mid-West Dairymen's Co., *The Mid-West Dairyman*, Jul. 15, 1980, pp. 1 and 5.
University of Minnesota Agricultural Extension Services, *Guidelines for the Installation, Maintenance, and Analysis of a Pipeline Milking System*, 1979, pp. 1–24.

*Primary Examiner*—Hugh R. Chamblee
*Attorney, Agent, or Firm*—Leydig, Voit, Osann, Mayer & Holt, Ltd.

[57] ABSTRACT

A central milking system with electrical units energized by an a.c. voltage source having an earth grounded neutral conductor. Stray current inherently produced in the neutral conductor by neutral-to-earth voltage is prevented from being conducted to the teats of the cow being milked via the flow of milk from the cow by creating a highly electric-insulating path between all bodies or films of milk which extend to the cow and all conductive components which are connected to the neutral conductor.

11 Claims, 4 Drawing Figures

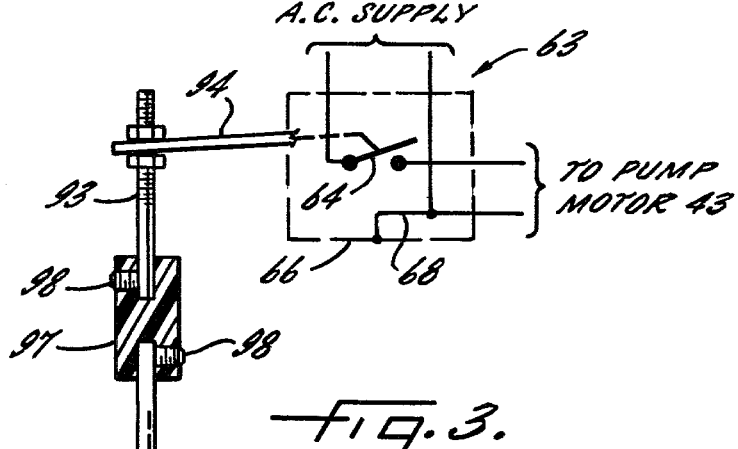
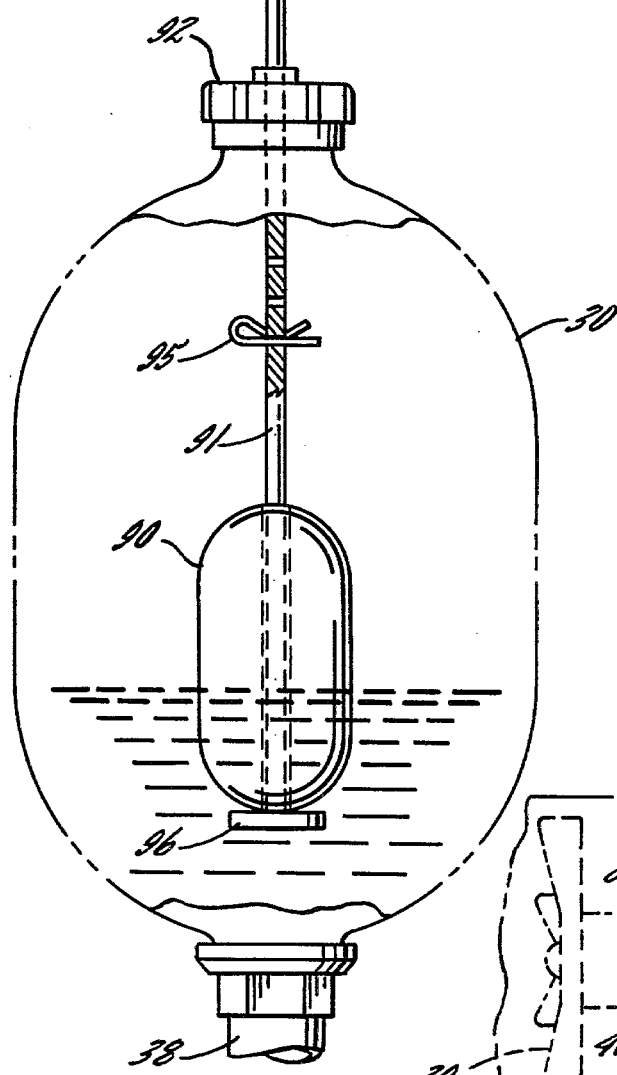
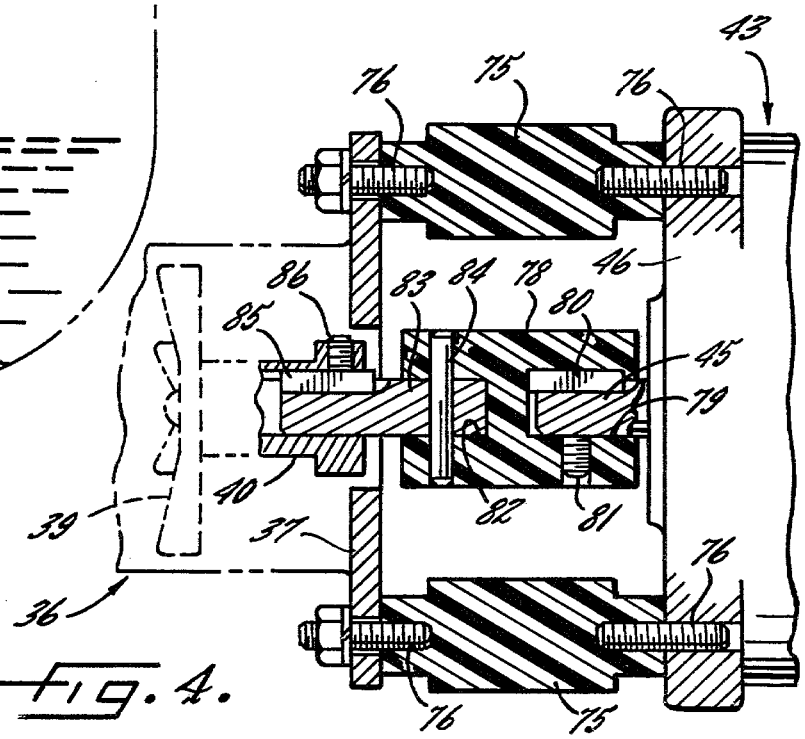

CENTRAL MILKING SYSTEM WITH REDUCED STRAY CURRENT PROBLEMS

BACKGROUND OF THE INVENTION

This invention relates to a piped, central collection system for milking animals such as cows.

In a typical system, a milking unit (e.g., a teat cup assembly and a claw) is suspended from the udder of the cow and includes air and milk tubes. An electrically controlled pulsator causes vacuum and atmospheric pressure to be introduced alternately into the air tube so as to effect massaging of the teats of the teat cup. The milk is drawn through the milk tube by vacuum and is delivered through a milk pipe to a receiver which separates the vacuum system from the milk flow system.

Associated with the receiver is a pump adapted to be driven by an electric motor and adapted to deliver the milk from the receiver to a bulk cooling tank. To prevent the receiver from overflowing while at the same time keeping the pump primed and avoiding excessive aeration of the milk, an electrical control automatically energizes the motor to start the pump when the milk rises to a predetermined level in the receiver and then automatically de-energizes the motor to stop the pump when the milk falls to a predetermined level short of the bottom of the receiver.

The motor, the control and other electrical units of the system are associated with an electrical power source (e.g., an a.c. voltage source) having an energizing conductor and having a neutral conductor which is grounded to earth at the electrical service entrance of the milking barn or parlor. For purposes of safety, the housings of the motor and the other electrical units are connected to the neutral conductor. In addition, other electrically conductive components of the milking parlor such as feeders, drinking tanks and water pipes normally are connected to the neutral conductor so that all such components will reside at substantially the same voltage level relative to one another.

In electrically operated milking systems of the foregoing type, voltage gradients between the earth and different conductive components which are connected to the neutral conductor often result in stray electrical currents passing through a portion of the cow's body. While such currents usually are small in magnitude (e.g., a few microamperes), they can cause emotional and/or physical stresses in the cow. As a result, the cow demonstrates reluctance to being milked and, even more importantly, holds her milk back and thus produces less milk and is more susceptible to mastitis.

The problems resulting from stray electrical voltage and currents in milking systems have been widely recognized. Many possible solutions for detecting and reducing such currents have been proposed as indicated, for example, by an article authored in 1978 by William Fairbank et al and entitled *Milking Parlor Metal Structure-To-Earth Voltages*, by another article authored in 1978 by R. D. Appleman and entitled *Neutral-To-Ground Voltage Problems With Dairy Cows* and by an article authored in 1979 by L. H. Soderholm and entitled *Stray-Voltage Problems In Dairy Milking Parlors*. One solution which has been widely attempted is to electrically bond all electrical units (e.g., motors and controls) and all conductive components (e.g., pipes, feeders and stalls) of the system directly back to the earth ground at the electrical service entrance. This makes all electrical units and conductive components reside at virtually the same voltage as the neutral conductor but does not eliminate different voltages from the various units and components to different earth points. Thus, the voltage to earth from the neutral conductor and a connected component at one earth location can be different from the voltage to earth from the neutral conductor and a connected component at another earth location because of the resistance of the earth between grounding points.

To eliminate the latter voltage differentials, it has been proposed to create an equipotential plane throughout the milk parlor, that is, to electrically shield the floor of the parlor from earth and to make the floor and all conductive equipment in the parlor reside at the same potential as the neutral conductor at the point at which the neutral conductor is earth grounded at the service entrance. If the floor and all conductive structures which the cow might contact with her hooves and with different parts of her body are at the same potential, stray current will not flow through the cow. It is, however, difficult and expensive to construct an equipotential plane throughout the floor of the parlor. Moreover, an equipotential plane requires that all outlet circuits in the parlor be equipped with ground fault interrupters for purposes of safety.

SUMMARY OF THE INVENTION

The primary aim of the present invention is to provide an effective, comparatively inexpensive and heretofore unrecognized solution to the problem of reducing stray electrical currents caused by neutral-to-earth voltage in an electrically operated milking system.

Specifically, the present invention is based on our discovery that stray current flowing through the neutral conductor of the system is conducted to conductive components which are (a) connected to the neutral conductor and (b) in contact with the liquid milk and then is conducted by the body of milk itself to the teats of the cow, and thence through the cow's body to earth via some earthed body portion such as a hoof. We have further found that such flow of stray current through the milk can be eliminated without constructing an equipotential plane in the parlor by creating a highly electric-insulating path between all conductive components which are connected to the neutral conductor and all bodies or films of milk which extend to the cow. As a result of the insulating path, stray neutral to earth voltage on the neutral conductor is prevented creating current to the cow's body by way of the milk and from the cow's body to earth.

Thus, an object of the invention is to provide a milking system in which the milk itself is highly electrically insulated from conductive components which are directly electrically connected to the neutral conductor.

A more detailed object is to provide a milking system in which the pump of the receiver is highly electrically insulated from the pump motor so as to prevent stray neutral-to-earth voltage on the housing of the motor from creating current flow to the pump and thence from the pump to the cow by way of the milk in the receiver and in the milk line.

Still another object is to provide a milking system in which the electrical control for automatically energizing and de-energizing the pump motor is highly electrically insulated from liquid level-responsive components which are in contact with milk in the receiver so as to prevent stray neutral-to-earth voltage at the housing of the control from sending current to the milk in the receiver and thence via milk in the milk line to the cow.

These and other objects and advantages of the invention will become more apparent from the following detailed description when taken in conjunction with the accompanying drawings.

BRIEF DESCRIPTION OF THE DRAWINGS

FIG. 3 is an enlarged fragmentary cross-sectional view taken axially through the milk receiver of the system shown in FIG. 1.

FIG. 4 is an enlarged fragmentary cross-sectional view taken axially through the milk pump and motor of the system shown in FIG. 1.

DETAILED DESCRIPTION OF THE PREFERRED EMBODIMENT

Figure 1:
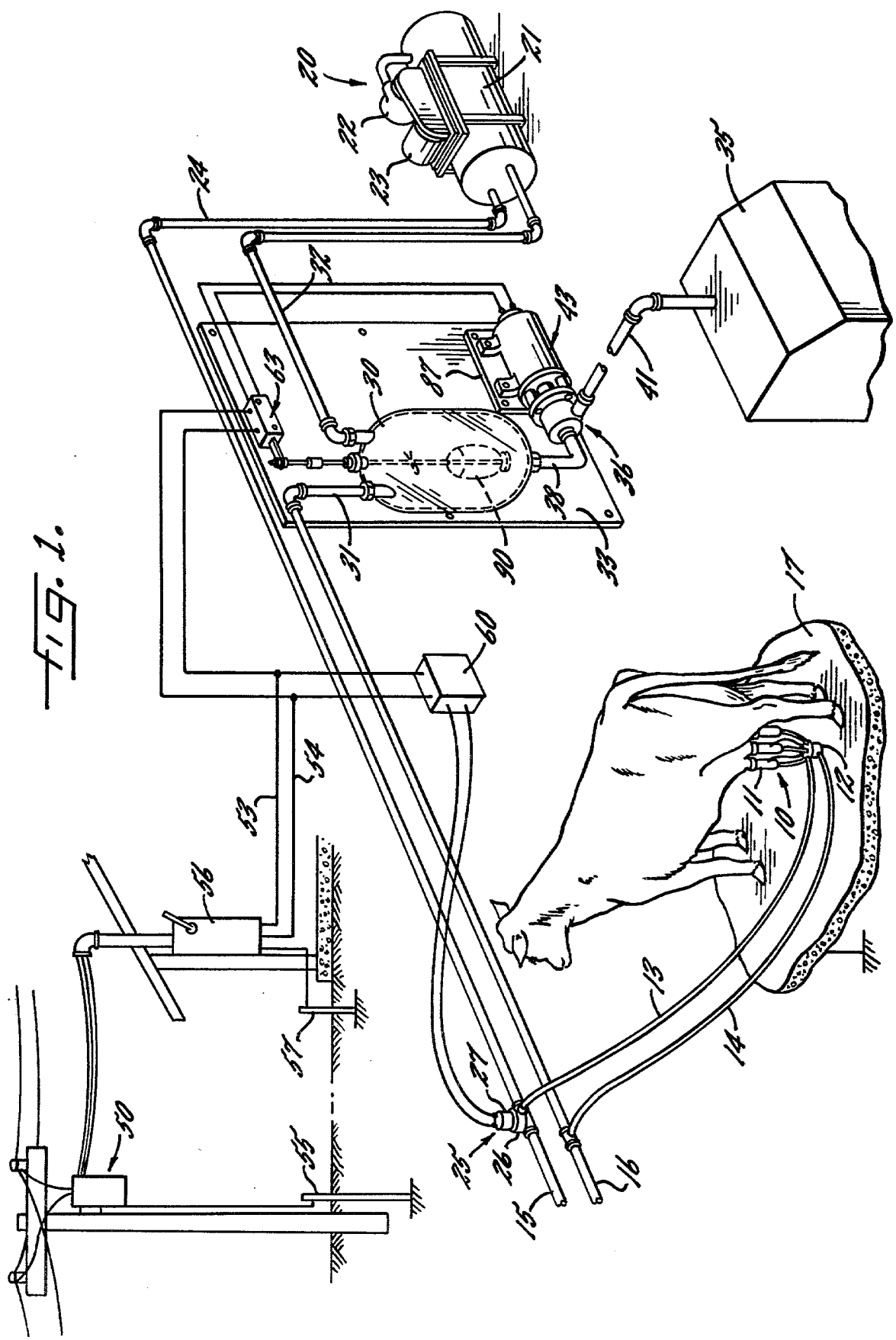
FIG. 1 is a perspective view which schematically shows a central milking system constructed in accordance with the present invention.

As shown in the drawings for purposes of illustration, the invention is incorporated in a piped, central collection system for milking cows or other animals. For the most part, the system has been shown schematically and only so much of the system as is necessary to an understanding of the invention has been illustrated and will be described. It will be understood that the system includes other conventional components which do not relate specifically to the present invention and which thus have not been disclosed.

In the typical system which has been illustrated, a milking unit 10 comprising a teat cup assembly 11 and a claw 12 is attached to and is suspended from the udder of each cow to be milked. Flexible air and milk tubes 13 and 14 made of synthetic rubber lead out of the milking unit and communicate with air and milk pipes 15 and 16, respectively, which extend along the milking parlor. It will be understood that several milking units communicate with the pipes 15 and 16 and thus those pipes serve several cows. The air pipe 15 may be plastic but the milk pipe 16 usually is made from stainless steel. The milk pipe is supported by metal posts (not shown) extending upwardly from the concrete floor 17 of the milking parlor and is isolated from the posts by electric insulators (not shown) in order to prevent electrolysis between the posts and the milk pipe.

A vacuum system 20 comprising a tank 21, a vacuum pump 22 and a motor 23 communicates with the air pipe 15 via a pipe 24. Connected into the air pipe 15 adjacent each air tube 13 is a pulsator 25 which basically comprises a valve 26 adapted to be shifted intermittently by an electrically controlled solenoid 27. When the valve of the pulsator is shifted first in one direction and then in the reverse direction, vacuum and atmospheric pressure are alternately introduced into the air tube 13 and the cup assembly 11. As a result, the cup assembly pulsates and massages the teats of the cow in a well-known manner to cause milk to flow from the teats.

Milk is drawn from the milking unit 10 and is delivered to a receiver 30 by vacuum. For this purpose, the milk pipe 16 communicates with the top of the receiver via a line 31. In addition, a vacuum line 32 extends from the vacuum system 20 and leads into the top of the receiver. The vacuum created in the receiver by means of the line 32 acts through the line 31, the milk pipe 16 and the milk tube 14 to suck milk from the milking unit 10 and into the receiver. The receiver serves to separate the milk and vacuum systems and usually is formed by a closed glass jar or by a closed stainless steel container. The receiver is mounted on an upright panel 33 which herein is made of stainless steel.

The milk in the receiver 30 is delivered to a bulk cooling tank 35 by a pump 36. In the present instance, the pump includes a stainless steel housing 37 (FIGS. 2 and 4) which communicates with the bottom of the receiver by way of a pipe 38. A stainless steel pumping element or impeller 39 is mounted rotatably within the housing and is connected to a metal shaft 40. When the impeller is rotated, the milk in the receiver is pumped through a line 41 (FIG. 1) and is delivered to the tank 35. To rotate the impeller 39, an electric motor 43 with a winding 44 (diagrammatically shown in FIG. 2) is mounted on the panel 33 and includes a rotary output shaft 45 drivingly connected to the impeller shaft 40, the housing 37 of the pump 36 being fastened to and being supported by the metal housing 46 of the motor. When milk flows into the receiver and rises to a predetermined level therein, the motor 43 is energized automatically to drive the pump 36 and cause the milk to be delivered from the receiver to the tank. When the milk falls to a predetermined level in the receiver, the motor is automatically de-energized to stop the pump. In this way, the pump is operated to draw milk from the receiver and yet the receiver is not completely emptied so as to avoid losing the prime on the pump and to avoid excessive aeration of the milk.

The various electrical units of the milking system are adapted to be energized by an a.c. power supply. A typical power supply system for a milking parlor is shown schematically in FIGS. 1 and 2 and includes a pole-mounted transformer 50 having a primary winding 51 connected to the electrical company substation and having a 230 volt center-tapped secondary winding 52 with two energizing conductors 53 and with a neutral conductor 54 coming from the center tap thereby forming two 115 volt circuits. In accordance with conventional practice, the neutral conductor 54 of the secondary is grounded to earth by a copper ground rod 55 connected to the neutral conductor and driven into the earth.

Figure 2:
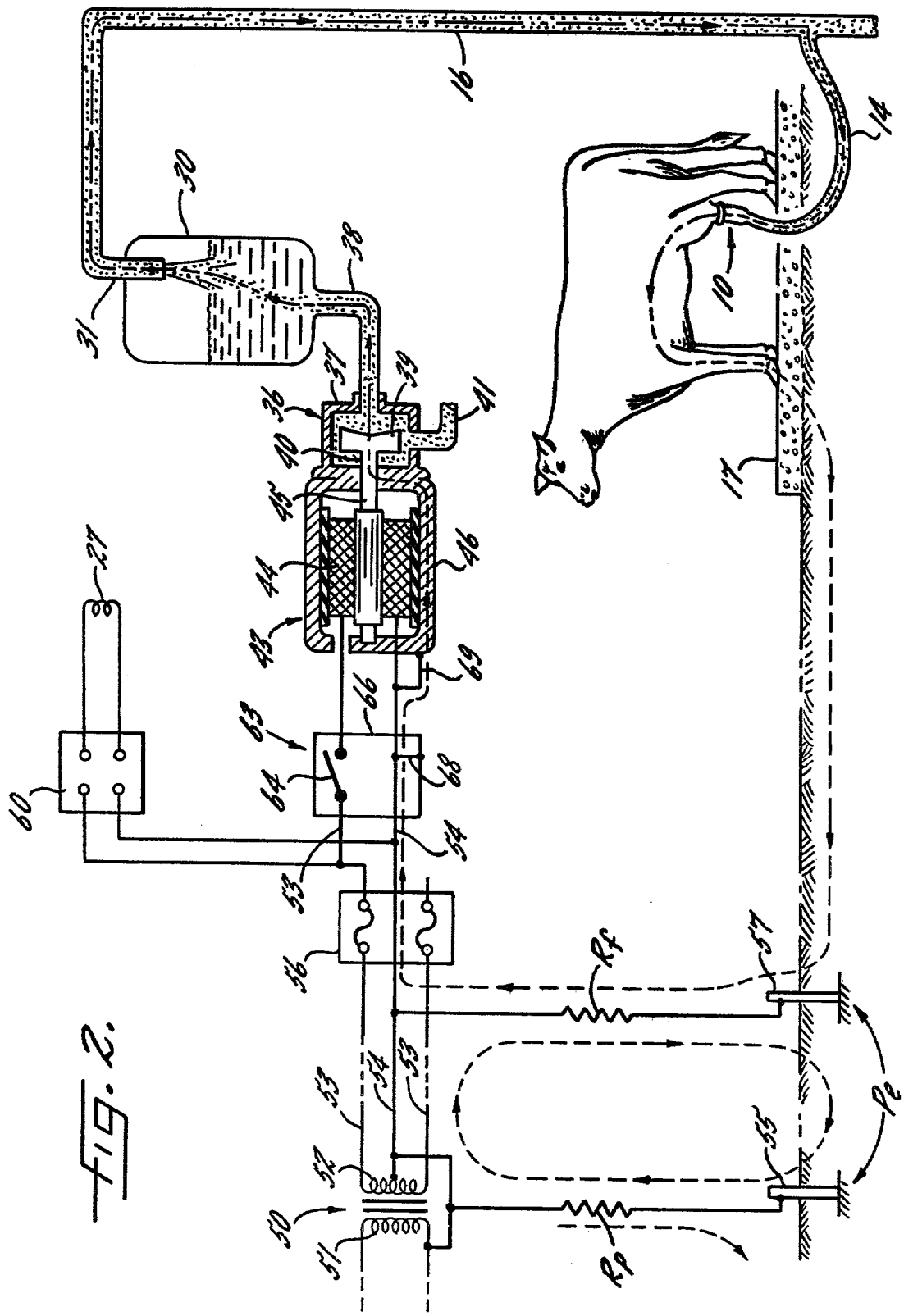
FIG. 2 is a circuit diagram and diagrammatic view which schematically illustrates the problem which we have discovered and solved by the present invention.

As shown in FIGS. 1 and 2, the conductors 53 and 54 lead to the electrical service entrance 56 of the milking parlor where the neutral conductor 54 again is grounded to earth by a copper rod 57. For simplicity, it has been assumed that the electrical units of the present system are operated from 115 volts a.c. and thus only one energizing conductor 53 and the neutral conductor 54 have been shown as extending into the milking parlor from the service entrance. Connected across the conductors is a control 60 which, at timed intervals, produces square wave d.c. voltage pulses across its output terminals, the pulses having a magnitude of about 24 volts. The pulses are routed to the solenoid 27 of the pulsator 25 and serve to repeatedly energize and de-energize the solenoid so as to shift the valve 26 and effect the intermittent application of vacuum and atmosphere pressure to the milking unit 10.

The winding 44 (FIG. 2) of the motor 43 also is connected across the conductors 53 and 54. In the present instance, the motor is energized and de-energized automatically by a control in the form of a switch 63 which is closed and opened automatically when the milk in the receiver 30 rises to and falls from predetermined levels.

The switch 63 is connected to the conductors 53 and 54 in series with the motor winding 44 and includes a contactor 64 located within a metal housing or box 66. In accordance with conventional practice and for purposes of safety, the box 66 of the switch 63 and the housing 46 of the motor 43 are connected directly to the neutral conductor 54. Herein, the switch box has been shown schematically as being connected to the neutral conductor by a wire 68 (FIG. 2) while the motor housing has been shown schematically as being connected to the neutral conductor by a wire 69.

The motor 43 and the switch 63, of course, constitute electrical units. Each of these units includes electrical elements (e.g., the motor winding 44 and the switch contactor 64) which, when active, are connected electrically to the energizing conductor 53. In addition, each unit includes conductive non-electrical elements (e.g., the motor housing 46 and the switch box 66) which are connected electrically and directly to the neutral conductor 54 but which are not connected electrically to the energizing conductor 53. Indeed, the housing 46 and the box 66 are insulated or isolated from the energizing conductor 53 and are insulated or isolated from the winding 44 and the contactor 64, respectively, and thus no energizing current flows through the housing and the box.

While energizing current is not conducted through the non-electrical elements 46 and 66 of the electrical units 43 and 63, current of small magnitude (sometimes called stray current) can flow between the non-electrical elements and the neutral conductor 54 to which the elements are connected. Such current results from so-called neutral-to-earth voltage differentials which often exist at different locations throughout the milking parlor.

The cause of neutral-to-earth voltage differentials may best be explained by reference to FIG. 2. In that view, the combined value of the resistance of (a) the neutral conductor of the transformer primary 51 and of (b) the metal-to-soil interface resistance of individual ground rods between the primary and the electrical substation, has been schematically represented as being an equivalent neutral and ground return-path resistor $R_p$ at the transformer ground rod 55. As current returns to the substation via the primary neutral and earth, a small voltage drop is created across the resistor $R_p$ at the ground rod 55.

The resistor $R_f$ in FIG. 2 schematically represents an equivalent of the metal-to-soil interface resistance between the ground rod 57 at the service entrance 56 to the immediately adjacent earth point. The voltage drop across the resistance $R_p$ causes current to flow between and through the resistors $R_p$ and $R_f$ via the neutral conductor 54 and the earth path labeled Pe. This results in a small voltage drop across the resistance $R_f$. The equivalent resistors $R_p$ and $R_f$ are those adopted in the above-identified article by Soderholm for purposes of explaining why a neutral-to-earth voltage may exist at various locations in a milk barn.

Because there is a voltage drop across the equivalent resistor $R_f$, current of small magnitude may flow between the neutral conductor 54 and earth via any conductive structure which might be connected both to the neutral conductor and to the earth beneath the floor 17 of the milking parlor at any point remote from the ground rod 57. Since the resistance of the earth varies from location-to-location beneath the milking parlor, the voltage between the neutral conductor and earth at one point in the parlor may be different from the voltage between the neutral conductor and earth at another point in the parlor.

It is well recognized that the neutral-to-earth voltage which exists in a milking parlor can cause stray currents to be conducted through the cows which are being milked. If, for example, a cow is contacting a metal feeder which, for purposes of safety, is connected to the neutral conductor 54, stray current may be conducted from the neutral conductor to the feeder, through the relatively low resistance of the cow's lips and body and then to earth by way of the cow's hooves and the concrete floor 17. The consensus is that stray currents resulting from neutral-to-earth voltages of less than 0.5 volts in magnitude probably have no adverse affect on the cows. If a higher neutral-to-earth voltage exists, however, the tingle shock of a few microamperes applied to the cow may be sufficient to disturb the cow either emotionally or physically. The cow then demonstrates nervousness in the parlor and tends to hold back her milk. This results in decreased production and increased occurrences of mastitis.

Those skilled in the art have known of the general problem of milk cows being disturbed by stray voltages at low levels, as confirmed by the volume of literature on the subject. The art has proposed solutions to alleviate the difficulty by such approaches as reducing stray voltages on drinking tanks and stall posts or hardware. Yet, the art has been puzzled by continued cow disturbance and loss of milk production, and this leads to the conclusion that skilled technicians have been unable to see a specific aspect of the general problem. Our invention is predicated on our discovery and recognition that an electrical path through liquid milk will seriously disturb cows, and the invention solves that specific and serious aspect of the problem. For if all other paths for stray current through a cow's body are eliminated, or if source voltages for such paths are reduced drastically, the cow will still be upset and disturbed greatly if stray current passes via a liquid milk path through her tender teats.

Specifically, the present invention is based on our discovery that stray current resulting from neutral-to-earth voltage can be and is conducted to a cow being milked through the flow of milk itself. Moreover, we have found that the conduction of stray current through the milk to the cow can be eliminated by establishing a highly electric-insulating path between all films and bodies of milk which extend to the cow and all conductive components of the system which are directly connected to the neutral conductor 54.

FIG. 2 illustrates one manner in which stray current resulting from neutral-to-earth voltage can be conducted between the neutral conductor 54 and the cow by way of the milk. As mentioned previously, the metal housing 46 of the motor 43 is connected directly to the neutral conductor 54 by the wire 69. As the electricians say, the motor housing is "grounded", meaning it is tied to the neutral conductor 54 which is "grounded" to earth by the rod 57.

The motor housing 46 is usually conductively connected to the pump housing 37. In addition, the motor shaft 45 normally is conductively connected to the pump shaft 40 and to the pump impeller 39. As a result, the pump housing and impeller usually are conductively connected to the neutral conductor 54 and, for practical purposes, normally form an extension of that conductor. Accordingly, any neutral-to-earth voltage existing on the neutral conductor 54 also exists on the pump housing and impeller.

As shown in FIG. 2, the pump housing 37 and impeller 39 also are in contact with the milk being drawn from the receiver 30. Milk, containing calcium and other salts which produce ions is an excellent liquid conductor of electrical current. The milk in the pump housing is connected electrically by the flow of milk in the line 38 to the body of milk in the receiver 30. The body of milk in the receiver, in turn, is connected electrically to the milk in the milk pipe 16 by the stream of milk which flows from the pipe into the receiver through the line 31. Milk in the pipe 16, of course, forms a continuation of the flow of milk from the flexible milk tube 14 and the milking unit 10. The milk in the milking unit is in direct contact with the cow's teats and udder. Accordingly, a conductive liquid path usually is established between the neutral conductor 54 and the cow's teats via the wire 69, the motor housing 46 and the pump 36 and then by way of the body of milk which extends from the pump housing 37 to the cow's teats. The cow's hooves are in contact with the concrete platform 17 which may be at a different earth potential than the ground rod 57 but which resides at some potential different from that of the neutral conductor 54 and the milk at the cow's teats. Thus, current created by neutral-to-earth voltage normally can flow from the neutral conductor to the cow's teats by way of the milk and then through the cow's body and hooves to the platform 17 and earth. If the cow happens to be drinking from a conductive water bowl on the platform or contacting a metal stall, still another conductive path through the cow to earth may be established.

We have discovered that current flowing to the cow via the conductive path established by the milk can be of sufficient magnitude to disturb the cow and to cause her to hold back her milk. Even if liquid milk is not physically flowing at a given time, a conductive path to the cow is nevertheless established by the milk film or residue on the walls of the pump housing 37, the receiver 30 and the milk pipe 16.

In carrying out the invention, the pump 36 is highly electrically insulated from the motor 43 so as to prevent current in the neutral conductor 54 and the motor housing 46 from being conducted to the pump and then to the milk. For this purpose, the pump housing 37 is separated from the motor housing 46 by four angularly spaced blocks 75 (FIG. 4) made of plastic or other highly-electrically insulative material. The blocks are sandwiched between adjacent ends of the pump and motor housings and are secured thereto by screws 76.

Means also are provided for insulating the pump shaft 40 electrically from the motor shaft 45 while rotatably connecting the two shafts. Herein, these means comprise a plastic coupler 78 (FIG. 4) having a hole 79 in one end for receiving the motor shaft 45. The latter is secured to the coupler by a key 80 and a set screw 81. Formed in the other end of the coupler is a hole 82 which receives a stub shaft 83, one end portion of the stub shaft being secured rigidly to the coupler by a pin 84. The other end portion of the stub shaft 83 is telescoped into the impeller shaft 40 and is secured thereto by a key 85 and a set screw 86.

By virtue of the plastic blocks 75 and plastic coupler 78, the conductive components forms by the pump housing 37 and the pump impeller 39 are insulated electrically from the conductive non-electrical elements (i.e., the motor housing 46 and motor shaft 45) of the motor. Accordingly, stray current from the neutral conductor 54 due to neutral-to-earth voltage is prevented from being conducted from the motor to the pump housing and impeller. Milk in the pump housing thus does not receive stray current via the neutral conductor and the motor and hence a source of stray current to the cow is eliminated. To prevent the panel 33 from establishing a conductive path between the pump and the motor, the latter is mounted on the panel 33 by a plastic board 87 (FIG. 1).

We have further found that stray current from prior level-responsive controls for receivers can be conducted to the cow by way of the milk. Accordingly, we have insulated all conductive components of the present control or switch 63 from the milk in the receiver 30.

Specifically, the switch 63 is actuated in response to the rising and falling of a stainless steel float 90 (FIG. 3) which is disposed within the receiver 30. The float is telescoped slidably over a stainless steel rod 91 which extends slidably through a cap 92 on the top of the receiver. The upper end of the rod 91 is connected to the lower end of another rod 93 whose upper end portion is connected to an actuator 94. The actuator arm is connected to and is electrically insulated from the switch contactor 64 and is disposed in conductive contact with the switch box 63.

When the level of milk in the receiver 30 rises, the float 90 slides upwardly along the rod 91 until the upper end of the float engages a pin 95 (FIG. 3) which is secured to the rod. As the milk continues to rise, the float acts against the pin and pushes the rods 91 and 92 and the switch actuator 94 upwardly. When the milk rises to a predetermined level in the receiver, the actuator 94 causes the switch contact 64 to close to energize the motor 43 and start the pump 36.

When milk is being pumped out of the receiver 30 at a rate faster than the inflow to the receiver, the float 90 slides downwardly along the rod 91. When the milk falls to a predetermined level, the float engages a disc 96 (FIG. 3) on the lower end of the rod. Such engagement pulls the rods 91 and 93 and the switch actuator 94 downwardly to open the switch contactor 64, de-energize the motor 43 and stop the pump 36.

In keeping with the invention, means are provided for preventing neutral-to-earth voltage on the neutral conductor 54 from causing current conduction to the milk in the receiver 30 via the switch box 66, the switch actuator 94, the rods 93 and 91 and the float 90. In the present instance, these means comprise a coupling 97 (FIG. 3) made of plastic or other highly-electric insulating material. The coupling is secured to the rods 91 and 93 by screws 98 and serves to connect the rods while insulating the rods from one another. Accordingly, stray current from the switch box 66 cannot be conducted through the actuator 94 and the rod 93 to conductive components such as the rod 91 and the float 90 which are disposed in contact with the milk in the receiver 30. Thus, there is no conductive path from the switch box to the cow via the milk.

It should be understood that, pursuant to the principles of the present invention, a highly-electric insulating path also should be established between all other conductive components of the system which are directly connected to the neutral conductor 54 and all bodies of milk which extend to a cow being milked. For example, if a motor is associated with the bulk tank 35, all conductive components of the motor should be insulated from the tank and the milk therein. Also, any other conductive components which are connected to the neutral conductor and which are associated with the tank should be insulated from the milk.

From the foregoing, it will be apparent that the present invention brings to the art a new and improved milking system wherein all conductive components that are in contact with the milk extending to the cow are highly electrically insulated from other elements which are connected physically to the conductive components and which are connected directly to the neutral conductor 54. As a result, stray current produced by neutral-to-earth voltage on the neutral conductor cannot pass to the cow via the milk. By eliminating the possibility of the cows being shocked through the milk, we have found that the cows are more content during the milking operation, show no reluctance to drinking water, and produce greater quantities of milk. We have further found that our invention reduces the shocks to the cows to such an extent that there is no need of constructing a relatively expensive equipotential plane at the floor of the milking parlor. Thus, we have discovered a comparatively economical solution to the problems created in a milking parlor by neutral-to-earth voltage.

We claim:

1. In a piped, central collection milking system which includes electrical units associated with an electrical power source having an earth grounded neutral conductor, said system further including electrically conductive components which are directly electrically connected to said neutral conductor, the improvement in said system comprising, means creating a highly electric-insulating path between (a) all electrically conductive components of the system which are directly connected to said neutral conductor and (b) all bodies or films of liquid milk which extend to the teat of an animal being milked.

2. In a piped, central collection milking system which includes electrical units associated with an electrical power source having an energizing conductor and having an earth grounded neutral conductor, said units having electrical elements connected electrically to said energizing conductor and having non-electrical elements directly electrically connected to said neutral conductor and not electrically connected to said energizing conductor, the improvement in said system comprising, means creating a highly electric-insulating path between all of said elements and all bodies or films of liquid milk which extend to the teat of an animal being milked.

3. In a piped, central collection milking system which includes electrical units associated with an electrical power source having an energizing conductor and having an earth grounded neutral conductor, said units having electrical elements connected electrically to said energizing conductor and having non-electrical elements directly electrically connected to said neutral conductor and not electrically connected to said energizing conductor, said system also including electrically conductive components which are conductively connected to the teat of an animal being milked by a body or film of liquid milk, the improvement in said system comprising, means creating a highly electric-insulating path between each of said components and all of said non-electrical elements of all electrical units to which said component is physically connected.

4. A milking system as defined in claim 3 in which one of said electrical units comprises an electric motor, one of said conductive components comprising a pump having a pumping element conductively connected at least part time to the teat of an animal by a body of liquid milk, said pumping element being physically connected to a non-electrical element of said motor and being adapted to be driven by said motor when the latter is energized, said means comprising means for electrically insulating said pumping element from said non-electrical element of said motor.

5. A milking system as defined in claim 4 in which said pump further includes a conductive housing enclosing said pumping element and physically connected to said non-electrical element of said motor, said last-mentioned means comprising means for electrically insulating said housing from said non-electrical element of said motor.

6. A milking system as defined in claim 4 in which said motor and said pump include shafts adapted to be rotated to drive said pumping element when said motor is energized, said motor shaft constituting a non-electrical element of said motor, said last-mentioned means comprising means for physically interconnecting said shafts while electrically insulating said shafts from one another.

7. A milking system as defined in claim 4 in which said motor includes a housing, said pump including a housing enclosing said pumping element and physically connected to the housing of said motor, said motor and said pump including shafts adapted to be rotated to drive said pumping element when said motor is energized, said motor housing and said motor shaft constituting non-electrical elements of said motor, said last-mentioned means including means for electrically insulating said pump housing from said motor housing and further including means for electrically insulating said shafts from one another while physically interconnecting said shafts.

8. A milking system as defined in claim 4 further including a receiver for collecting milk from the teat of an animal being milked, said pump being operable when driven to pump milk out of said receiver, another one of said components comprising a conductive member disposed within the milk in said receiver and responsive to the level of milk therein, another one of said electrical units comprising an electrical control operable to energize and de-energize said motor, said member being physically connected to said control and being operable to actuate said control to energize said motor when the milk in said receiver rises to a predetermined level and further being operable to actuate said control to de-energize said motor when the milk in said receiver falls to a predetermined level, said first-mentioned means further comprising means for electrically insulating said member from all non-electrical elements of said control while physically connecting said member and said control to permit said member to actuate said control.

9. In a piped central collection milking system associated with an electrical power source having an energizing conductor and having an earth grounded neutral conductor, said system including a receiver adapted to collect a flow of liquid milk from the teat of an animal being milked, a pump having a pumping element and having a surrounding housing each conductively connected at least part time to the teat of the animal by the milk in said flow, said pumping element being operable when driven to deliver milk from said receiver, an electric motor adapted to be energized by said power source and adapted when energized to drive said pumping element, said motor having elements directly electrically connected to said neutral conductor and not electrically connected to said energizing conductor, the improvement in said system comprising, means for electrically insulating said pumping element and said housing from said elements of said motor.

10. A system as defined in claim 9 further including a conductive member disposed within the milk in said receiver and responsive to the level of milk therein, an electrical control connected to said conductors and operable to energize and de-energize said motor, said member being physically connected to said control and being operable to actuate said control to energize said motor when the milk in said receiver rises to a predetermined level and further being operable to actuate said control to de-energize said motor when the milk in said receiver falls to a predetermined level, and means for electrically insulating said member from all parts of said control while physically connecting said member and said control to permit said member to actuate said control.

11. A method of avoiding electrically caused physical or emotional stresses in animals being milked by a piped central collection milking system having electrical units associated with an electric power source having an earth grounded neutral conductor, said system further including electrically conductive components which are directly electrically connected to said neutral conductor, said method comprising the step of constructing or modifying the system to interpose a highly electric-insulative path between (a) all conductive components which are directly electrically connected to said neutral conductor and (b) all bodies or films of liquid milk which extend via reservoirs or conduits to the teat of an animal being milked.

* * * * *